(12) United States Patent
Chen et al.

(10) Patent No.: US 7,071,248 B2
(45) Date of Patent: Jul. 4, 2006

(54) ADHESIVE ADDITIVES AND ADHESIVE COMPOSITIONS CONTAINING AN ADHESIVE ADDITIVE

(75) Inventors: Gang-Fung Chen, Dublin, OH (US); Stephen Hupp, Dublin, OH (US); Philip L. Schell, Dublin, OH (US)

(73) Assignee: Ashland Licensing and Intellectual Property, LLC, Dublin, OH (US)

( * ) Notice: Subject to any disclaimer, the term of this patent is extended or adjusted under 35 U.S.C. 154(b) by 268 days.

(21) Appl. No.: 10/347,435

(22) Filed: Jan. 21, 2003

(65) Prior Publication Data

US 2004/0140055 A1 Jul. 22, 2004

(51) Int. Cl.
*C08L 1/02* (2006.01)
*C08L 97/02* (2006.01)

(52) U.S. Cl. .................. 524/14; 156/331.4; 156/331.7; 252/182.2; 252/182.24; 252/182.28

(58) Field of Classification Search ................. 524/14, 524/310–313; 156/331.4, 331.7; 252/182.2, 252/182.24, 182.28
See application file for complete search history.

(56) References Cited

U.S. PATENT DOCUMENTS

| | | | | |
|---|---|---|---|---|
| 3,255,500 | A | * | 6/1966 | Engel et al. ................. 164/526 |
| 3,844,706 | A | * | 10/1974 | Tsaras ......................... 431/288 |
| 4,267,081 | A | * | 5/1981 | Seneker .......................... 525/7 |
| 4,313,858 | A | * | 2/1982 | Earing et al. ................. 524/313 |
| 4,345,058 | A | * | 8/1982 | Dettling ........................ 528/48 |
| 4,528,154 | A | | 7/1985 | Nguyen et al. |
| 4,609,513 | A | | 9/1986 | Israel |
| 4,742,112 | A | | 5/1988 | Brauer et al. |
| 4,752,637 | A | | 6/1988 | Israel |
| 4,833,182 | A | | 5/1989 | Israel et al. |
| 4,898,776 | A | | 2/1990 | Israel et al. |
| 5,504,145 | A | * | 4/1996 | Treasurer .................... 524/591 |
| 5,554,438 | A | | 9/1996 | Marcinko et al. |
| 5,580,922 | A | | 12/1996 | Park et al. |
| 5,587,414 | A | | 12/1996 | Leenslag et al. |
| 5,688,989 | A | * | 11/1997 | Daute et al. .................. 560/26 |
| 5,744,079 | A | | 4/1998 | Kimura et al. |
| 5,776,354 | A | * | 7/1998 | van der Meer et al. ..... 210/806 |
| 5,795,949 | A | * | 8/1998 | Daute et al. ................... 528/65 |
| 5,942,058 | A | | 8/1999 | Sleeter et al. |
| 6,022,444 | A | | 2/2000 | Haider et al. |
| 6,224,800 | B1 | | 5/2001 | Rosthauser |
| 6,352,661 | B1 | | 3/2002 | Thompson et al. |
| 6,365,650 | B1 | | 4/2002 | Chen et al. |
| 6,375,876 | B1 | * | 4/2002 | Kessler et al. ................. 264/41 |
| 2003/0104048 | A1 | * | 6/2003 | Patel et al. .................. 424/451 |
| 2003/0158257 | A1 | * | 8/2003 | Hase et al. .................. 514/547 |
| 2003/0191273 | A1 | * | 10/2003 | Gertzmann et al. ........... 528/44 |
| 2003/0199433 | A1 | * | 10/2003 | Hauer et al. ................... 514/11 |
| 2004/0039095 | A1 | * | 2/2004 | Van de Mark et al. ..... 524/315 |
| 2004/0138402 | A1 | * | 7/2004 | Thiele et al. ............... 528/74.5 |
| 2004/0167343 | A1 | * | 8/2004 | Halpern et al. ............. 554/176 |
| 2004/0209911 | A1 | * | 10/2004 | Fricker et al. ............... 514/291 |

FOREIGN PATENT DOCUMENTS

| | | | |
|---|---|---|---|
| EP | 0067426 | B1 | 12/1982 |
| EP | 0173866 | A1 | 3/1986 |
| EP | 0877767 | | 8/1997 |
| EP | 0929587 | | 10/1997 |
| EP | 0890618 | A1 | 1/1999 |
| JP | 59-032980 | * | 9/1985 |
| JP | 2208005 | | 8/1990 |
| JP | 2214602 | | 8/1990 |
| JP | 05-247169 | * | 9/1993 |
| JP | 60-177013 | * | 9/1995 |
| JP | 9078049 | | 3/1997 |
| JP | 10152666 | | 6/1998 |
| JP | 10180725 | | 7/1998 |
| JP | 11124562 | | 5/1999 |

* cited by examiner

*Primary Examiner*—Peter Szekely
(74) *Attorney, Agent, or Firm*—Connolly Bove Lodge & Hutz, LLP

(57) ABSTRACT

Adhesive additives that are used in conjunction with polyisocyanate resins to form adhesive compositions. The adhesive additives contain castor oil, a mixture of castor oil and triglycerides, or a reaction product from the transesterification of one or more polyols and one or more triglycerides. The adhesive compositions are well suited for use as a binder in the manufacture of various composite products, particularly composite wood products including OSB construction panels and laminate composites.

21 Claims, No Drawings

ADHESIVE ADDITIVES AND ADHESIVE COMPOSITIONS CONTAINING AN ADHESIVE ADDITIVE

FIELD OF THE INVENTION

The invention is directed to adhesive additives and adhesive compositions containing polyisocyanate resins and an adhesive additive. The adhesive compositions are well suited for use as a wood binder, particularly in the manufacture of wood composites.

BACKGROUND OF THE INVENTION

During the last decade oriented strand board (OSB) has become a particularly important wood product in the home construction industry. Since its appearance in 1978, OSB has become the most rapidly growing wood-based composite product. OSB is primarily used as a structural panel, which in the past was dominated by softwood plywood. In 1999, OSB production passed softwood plywood in North America for the first time. Approximately 20.325 billion SF of OSB were produced in 1999 compared 20.275 billion SF of softwood plywood.

Presently, adhesives used in binding systems for OSB and other composite wood products include phenol-formaldehyde (PF), urea-formaldehyde, polyvinyl acetate, resorcinol-formaldehyde, polymeric diphenylmethane diisocyanate (pMDI), and hot melt adhesives. Approximately 18% of OSB production in North America utilizes a polyisocyanate-based adhesive.

Polyisocyanate adhesive systems provide significant advantages over the more traditional PF-based adhesive systems. These advantages include a relatively fast cure, insensitivity to moisture, tolerances for seasonal changes, and final composite properties such as thickness swell, durability, internal bond, and modulus of the finished products. However, the polyisocyanate-based adhesives raise an issue of cost and issues related to production. Polyisocyanate adhesives are generally more expensive (for comparison, PF resin is about 0.35/lb, and most popular polyisocyanates are about 0.65/lb). Also, OSB boards produced with polyisocyanate have a tendency to adhere to the platens during manufacture. This adhesion can damage or even ruin the board product, and the subsequent cleanup of the contaminated platens is difficult, time-consuming and costly.

Commercial suppliers of polyisocyanate-based adhesives have long sought to produce an effective self-releasing polyisocyanate product for composite wood products including OSB. Various attempts have been made to overcome the platen adhesion problem without sacrificing other desirable board properties. The addition of release agents such as oils, wax polishes, silicone and polytetrafluoroethylene directly to the platen surface has helped somewhat. Another approach involves the addition of release agents to the adhesive system.

The use of polyisocyanate adhesives can also raise health and work-safety environmental issues. Polyisocyanates can react with moisture on the skin or with moisture in the lungs, if inhaled as atomized polyisocyanate or isocyanate-coated wood dust. One popular type of polyisocyanate used in the composite wood industry is polymeric diphenylmethane diisocyanate (pMDI). pMDI can contain a wide range of oligomers of varying amounts, typically 40–60% of monomeric 4,4'-diphenylmethane diisocyanate (MDI). As the curing reaction with water occurs an intermediate reaction product, 4,4'-diaminophenylmethane (MDA), is produced. Because MDA is a relatively toxic chemical its presence needs to be maintained at a minimum. Also, to avoid hazardous work-place conditions cure rates should be relatively rapid and the curing reaction should approach completion with a minimum of non-reacted product as well as undesirable intermediate side products, e.g., MDI and MDA.

U.S. Pat. No. 5,942,058 describes the use of a fast-setting resin such as p-MDI with a slow-setting, co-adhesive such as a conjugated, triglyceride drying oil for making composite panels such as OSB, plywood, MDF, hardboard, and similar panels. U.S. Pat. No. 4,742,112 describes the use of liquid esters or vegetable oil extenders such as linseed oil, corn oil, trioctyl trimellitate, soybean oil, ditridecyl adipate, or dibutyl phthalate to enhance compatibility with cable greases. The vegetable oil is added to lower the viscosity of the high viscosity hydrocarbon polymer polyol. Similarly, U.S. Pat. No. 6,352,661 describes the use of a high flash point diluent (>250° F.) such as aromatic hydrocarbon, phthalic acid derivative, parrafinic distillate solvent, propylene carbonate, chlorinated paraffin, or alkyl sulfonic ester of phenol to reduce the viscosity of polyisocyanate resins used to make wood composite products.

Given the relatively high cost of polyisocyanate adhesive, the platen sticking problem, and the health issues raised it is desirable to reduce the relative content of polyisocyanate in an adhesive composition. However, the reduction in polyisocyanate content must not compromise the performance of the finished products. These objectives remain quite a challenge to those in the industry.

SUMMARY OF THE INVENTION

The invention is directed to adhesive additives that are mixed with one or more polyisocyanate resins to form an adhesive composition. The adhesive compositions are well suited for use as a binder in the manufacture of various composite wood products including construction panels and laminate composites. The adhesive compositions are also well suited for use as a binder for synthetic fibers such as polyester or glass fibers.

In one embodiment, the adhesive additive comprises castor oil, and one or more triglycerides. The castor oil and the one or more triglycerides are provided as a weight ratio of castor oil to triglyceride from about 4:1 to about 1:4. Soybean oil, canola oil, corn oil, and linseed oil are the preferred triglycerides used in the adhesive additives of the invention. The adhesive additive can also contain a catalyst to promote the compatibility of the adhesive additive with a polyisocyanate resin.

In another embodiment, the adhesive additive comprises a reaction product from the transesterification of one or more polyols and one or more triglycerides, wherein the weight ratio of polyol to triglyceride provides a calculated hydroxyl functionality of about 1.3 to about 2.6 in the transesterified reaction product.

The invention is also directed to adhesive compositions containing the adhesive additives. In one embodiment, the adhesive composition comprises one or more polyisocyanate resins, and an adhesive additive containing castor oil, and one or more triglycerides. The castor oil and the one or more triglycerides are provided as a weight ratio of castor oil to triglyceride from about 4:1 to about 1:4. Also, the one or more polyisocyanate resins and the adhesive additive are generally provided in a weight ratio of resin to adhesive additive from about 4:1 to about 2:3, preferably from about 3:1 to about 1:1.

Another embodiment includes an adhesive composition for OSB manufacture comprising one or more polyisocyanate resins and castor oil. The resins and the castor oil are present in a respective weight ratio from about 3:1 to about 1:2, preferably from about 3:2 to about 2:3. The amount of adhesive composition used during OSB manufacture is from 1% to 10% by weight relative to the weight of the wood strands. Also, the preferred resin used in this adhesive composition is selected from diphenylmethane diisocyanate, polymethylene polyphenyl isocyanates, or polyphenylene diisocyanates.

Another embodiment includes an adhesive composition for wood composites comprising one or more polyisocyanate resins, and an adhesive additive comprising a reaction product from the transesterification of one or more polyols and one or more triglycerides. A weight ratio of polyol to triglyceride provides a calculated hydroxyl functionality of about 1.3 to about 2.6 in the transesterified reaction product. The polyisocyanate resins and the adhesive additive are generally provided in a weight ratio of resin to additive from about 5:1 to about 2:3, preferably from about 3:1 to about 1:1.

The invention is also directed to a wood composite containing wood strands and a cured binder. The cured binder includes a crosslinked polymer that is a reaction product of one or more polyisocyanate resins, and an adhesive additive containing castor oil and one or more triglycerides. The castor oil and the one or more triglycerides are provided as a weight ratio of castor oil to triglyceride from about 4:1 to about 1:4. The crosslinked polymer is preferably prepared from the polyisocyanate resins and the adhesive additive provided in a weight ratio of resin to adhesive additive from about 3:1 to about 1:1.

In another embodiment, the wood composite contains a cured binder that comprises a crosslinked polymer that is a reaction product of one or more polyisocyanate resins and castor oil. The resins and the castor oil are provided in a respective weight ratio from about 3:1 to 1:2, preferably from about 3:2 to about 2:3. The cured binder is present in an amount of 1% to 10% by weight based on the weight of the wood strands.

In another embodiment, the wood composite contains a cured binder that comprises a crosslinked polymer that is a reaction product of one or more polyisocyanate resins and an adhesive additive, the adhesive additive comprising a reaction product from the transesterification of one or more polyols and one or more triglycerides. A weight ratio of polyol to triglyceride provides a calculated hydroxyl functionality of about 1.3 to about 2.6 in the transesterified reaction product.

DETAILED DESCRIPTION OF THE INVENTION

The invention is directed to adhesive additives that are mixed with one or more polyisocyanate resins to form an adhesive composition. The adhesive compositions are well suited for use as a binder in the manufacture of various composite wood products including construction panels and laminate composites. The amount of adhesive additive of the invention that is added to the polyisocyanate resins, referred to in this application as a weight ratio, depends upon a number factors including the mix viscosity, type of wood product, type of polyisocyanate resin, and end-use or application of the final wood composite.

In one embodiment, the adhesive additives comprise castor oil, and one or more triglycerides, which are provided as a weight ratio of castor oil to triglyceride from about 4:1 to about 1:4. The preferred triglycerides are selected from soybean oil, canola oil, corn oil, or linseed oil. It is proposed, though not fully understood, that each component in the adhesive additive has a role in the overall adhesive composition. The role of castor oil is to react and crosslink with the polyisocyanate resin to form a cured adhesive with high crosslink density. The role of the triglyceride is to reduce the viscosity of the adhesive composition.

In certain instances, a catalyst can also be added to the adhesive additive of the invention. The role of a catalyst such as dibutyltin diluarate (T-12) is to promote compatibility of the polyisocyanate resin and adhesive additive in an adhesive composition. If used, the catalyst is generally present in an amount from 0.02% to 0.25% by weight. As will be demonstrated in this application, compatibility of the components in a two-part, resin/additive adhesive system can be particularly important in the manufacture of oriented strand board (OSB).

The weight ratio of castor oil to triglyceride in the adhesive additives of the invention is from about 4:1 to about 1:4, from about 3:1 to about 1:2, or form about 3:1 to about 1:1. The stated weight ratios of castor oil to triglyceride provide a calculated hydroxyl functionality of about 2.5 at high castor oil concentrations and about 0.5 at low castor oil concentrations. Typically, an adhesive additive with a greater calculated hydroxyl functionality for a given polyisocyanate resin and weight ratio of resin to additive will provide a cured adhesive with a relatively high crosslink density. However, as will be demonstrated, other characteristics of the adhesive composition also factor into a desired overall performance.

The average calculated hydroxyl functionality is obtained by dividing the total number of hydroxyl groups by the total number of moles of ingredients present in the formulation. For example, the average molecular weight of castor oil and soybean oil is 927 and 876, respectively. If equal amounts by weight of these two oils are mixed together, the resulting oil blend would have the calculated molar ratio of castor oil and soybean oil of 1:1.06. Because the soybean oil has no hydroxyl group and based on the assumption that castor oil has three hydroxyl groups per mole, the calculated average hydroxyl functionality would be $3/(1+1.06)=1.5$. To be more precise, the hydroxyl functionality of castor oil is close to 2.6 per mole. This is because the castor oil has approximately 88% of ricinoleic acid, which has three hydroxyl groups per mole. A hydroxyl functionality of castor oil of 3 per mole is used in this application to calculate average calculated hydroxyl functionality.

Similarly, if a transesterification reaction is carried out by reacting 300 g of soybean oil (0.34 mole, no hydroxyl group) and 41.7 g of pentaerythritol (0.31 mole, four hydroxyl groups per mole), the resulting reaction product will have an average calculated hydroxyl functionality of $4 \times 0.31/(0.34+0.31)=1.9$.

One preferred adhesive additive of the invention will comprise castor oil, and one or more triglycerides selected from soybean oil, canola oil, corn oil, or linseed oil, wherein the castor oil and the one or more triglycerides are provided as a weight ratio of castor oil to triglyceride from about 3:1 to about 1:1. The adhesive additive can also contain a catalyst to enhance compatibility of the adhesive additive with the polyisocyanate resin. The adhesive additive can also be characterized by a calculated hydroxyl functionality of about 2.5 to about 1.5.

In another embodiment, the adhesive additive comprises a reaction product from the transesterification of one or more polyols and one or more triglycerides. A weight ratio of polyol to triglyceride used in the transesterification reaction provides a calculated hydroxyl functionality of about 1.3 to about 2.6 in the tranesterified reaction product. Though not necessary, the adhesive additive can also include a catalyst to promote compatibility of the adhesive additive with a polyisocyanate resin.

The adhesive additive is prepared by adding a polyol and one or more of the selected triglycerides to a reaction vessel. Typically, no reaction solvent is needed in the transesterification reaction. It is preferred that the reaction mixture is provided with a nitrogen environment. As the temperature of the reaction mixture approaches about 240° C., a catalyst is added. This reaction is usually catalyzed by basic compounds such as metal oxides, hydroxides, or salts. One preferred catalyst used in the transesterification reaction is lithium acetate. The reaction temperature is then maintained between 240° C. to 250° C. for an additional 30 minutes to one hour.

The transesterification reaction refers to the reaction of one or more of the selected triglycerides with one or more of the selected polyols to randomly distribute the fatty acids among the polyols. Hydroxy groups are released from the polyols and redistributed among the triglycerides. The preferred triglycerides used in the transesterification reaction are selected from soybean oil, canola oil, corn oil, or linseed oil. The transesterified product can contain mono-, di- and triesters, unreacted polyol, and glycerol.

The polyol used to prepare the adhesive additive can be any number of commercially available polyols. Preferred polyols will have a molecular weight of less than 400, more preferably less than 200. Also, the preferred polyols will have at least two hydroxyl groups per molecule. An exemplary list of polyols that can be used to prepare the adhesive additives of the invention include trimethylolpropane, neopentlyglycol, pentaerythritol, and castor oil.

Present OSB manufacturing practices include binding systems based on phenol-formaldehyde and polyisocyanates. Polyisocyanates typically provide more favorable properties such as insensitivity to moisture, tolerances for seasonal changes, and final composite properties such as thickness swell, durability, internal bond, and modulus of the finished products. Unfortunately, a pound of polyisocyanate resin is almost twice as expensive as a pound of phenol-formaldehyde adhesive. Although typical binding systems make up only about 1% to 3% by weight of the OSB product, OSB is a commodity product and approximately 20 billion square feet of OSB was produced in 1999. The difference in relative cost is thus multiplied over a million-fold annually.

Applicants have sought ways to reduce this cost by substituting a portion of the polyisocyanate resin with other materials. Of course, the respective reduction in the amount of polyisocyanate resin in the binding system should have little, or no, compromising effect with respect to the properties of the final product.

The introduction of a secondary component such as an adhesive additive to a polyisocyanate resin can lead to problems not encountered in one-part binding systems. For example, the working viscosity of the adhesive composition can change. Also, the secondary component may not be compatible with the primary component, i.e., the polyisocyanate resin especially in the range that is desired for maintaining the present advantages of a polyisocyanate-based system.

Consequently, developing a working binding system in which a portion of the polyisocyanate is replaced by a secondary component is not just determining which secondary system can be used, but also, once a particular combination is potentially identified by exhaustive testing, problems related to viscosity and compatibility must also be addressed and solved. At a binder concentration of 1% to 3%, it is vital that the adhesive must be sufficiently and uniformly distributed onto the loose wood strands. To achieve sufficient and uniform distribution of the adhesive composition, the viscosity of the adhesive must necessarily be low enough to ensure optimal misting of the adhesive. Generally during OSB processing, the adhesive composition is provided as a mist or aerosol by atomizing the adhesive with a spinning disk atomizer. The misted adhesive ensures optimal wetting or coating of the wood strands with the adhesive prior to hot pressing. If the application viscosity, i.e., the viscosity of the adhesive during application to the strands, is too high, the adhesive does not atomize as well, which leads to a reduced resin distribution, and eventually unbound strands in the product. The application viscosity of an adhesive composition can be measured up to about 10 minutes after mixing of the resin and additive. The preferred time to measure the application viscosity is 1 to 3 minutes after mixing.

Compatibility between the resin and adhesive additive is also important because the resin needs to crosslink with the additive to form a relatively strong, cured adhesive. If the resin and additive separate prior to, during, or after application to the strands, the propensity for the two components to react during the pressing step, and hence, crosslink is greatly diminished. The result of which is a poor performing OSB product, as would be expected.

To ensure optimal compatibility between the polyisocyanate and the adhesive additive, a catalyst is often included in the adhesive composition. Adhesive compositions containing catalyst also exhibit a lower working viscosity, which results in optimal atomization, and hence, favorable distribution among the wood strands.

The invention is also directed to adhesive compositions containing the adhesive additives of the invention. In one embodiment, an adhesive composition of the invention comprises one or more polyisocyanate resins, and an adhesive additive containing castor oil, and one or more triglycerides, which are provided as a weight ratio of castor oil to triglyceride from about 4:1 to about 1:4, preferably from about 3:1 to about 1.5:1. The stated weight ratios of castor oil to triglyceride provide a calculated hydroxyl functionality of about 2.5 at high castor oil concentrations and about 0.5 at low castor oil concentrations. Typically, an adhesive additive with a greater calculated hydroxyl functionality for a given polyisocyanate resin and weight ratio of resin to additive will provide a cured adhesive with greater crosslink density.

The preferred triglycerides present in the additive that is used to prepare the adhesive compositions of the invention are selected from soybean oil, canola oil, corn oil, or linseed oil. The adhesive can also contain secondary polyols, in addition to the castor oil already present in the composition.

In a preferred embodiment, the adhesive composition will also contain a catalyst. It is believed that the role of the catalyst is to promote compatibility between the polyisocyanate resin and the adhesive additive and to reduce the initial mix viscosity for optimal resin distribution during a manufacturing process, particularly OSB manufacture. The catalyst can be one of the many commercially available catalysts used in conjunction with polyisocyanate resins. An exemplary list of catalysts that can be used include amine-based catalysts such as triethylamine, triethylenediamine, N-methylmorpholine, or metal-based catalysts such as dibutyltin dilaurate (T-12), potassium octoate, stannous octoate, and potassium 2-ethylhexanoate.

The polyisocyanate resins that can be used in the adhesive compositions of the invention include hexamethylene diisocyanate, toluene diisocyanate (TDI), diphenylmethane diisocyanate (MDI), m- and p-phenylene diisocyanates, bitolylene diisocyanate, cyclohexane diisocyanate (CHDI), bis-(isocyanatomethyl) cyclohexane ($H_6$XDI), dicyclohexylmethane diisocyanate ($H_{12}$ MDI), dimer acid diisocyanate (DDI), trimethyl hexamethylene diisocyanate, lysine diisocyanate and its methyl ester, isophorone diisocyanate, methyl cyclohexane diisocyanate, 1,5-napthalene diisocyanate, xylylene and xylene diisocyanate and methyl derivatives thereof, polymethylene polyphenyl isocyanates, chlorophenylene-2,4-diisocyanate, polyphenylene diisocyanates, for example, those sold as Mondur MR or Mondur MRS, isophorone diisocyanate (IPDI), hydrogenated methylene diphenyl isocyanate (HMDI), tetramethyl xylene diisocyanate (TMXDI), hexamethylene diisocyanate (HDI), and oligomer materials of the forementioned polyisocyanates. Triisocyanates and high-functional isocyanates can also be used. The preferred polyisocyanate resins include hexamethylene diisocyanate, toluene diisocyanate, diphenylmethane diisocyanate, polymethylene polyphenyl isocyanates, polyphenylene diisocyanates, and hydrogenated methylene diphenyl isocyanate. The most preferred resins include diphenylmethane diisocyanate, polymethylene polyphenyl isocyanates, and polyphenylene diisocyanates.

The relative amounts of polyisocyanate resin and adhesive additive present in the adhesive compositions will vary depending upon the desired characteristics of the adhesive during application, e.g., compatibility or viscosity, and the desired strength of the cured adhesive, which typically corresponds with the degree of crosslinking between the resin and additive.

Applicants have tested a number of adhesive compositions of the invention at various weight ratios of polyisocyanate resin to adhesive additive under different testing protocols commonly used by those in the industry. Applicants have also field-tested a number of adhesive compositions of the invention and determined the optimized weight ratios for OSB manufacture. The preferred weight ratio of polyisocyante resin to adhesive additive was determined to be from about 5:1 to about 2:3, and more preferably from about 3:1 to about 1:1.

For OSB manufacture, the preferred adhesive additive used in the adhesive composition is a mixture of castor oil and one or more triglycerides. The weight ratio of castor oil to triglyceride in the adhesive additives of the invention is from about 4:1 to about 1:4, preferably about 3:1 to about 1:1. The adhesive additive for this application preferably contains at least 60% by weight castor oil. The stated weight ratios of castor oil to triglyceride provide a calculated hydroxyl functionality of about 2.5 at high castor oil concentrations and about 0.5 at low castor oil concentrations. Typically, an adhesive additive with a greater calculated hydroxyl functionality for a given polyisocyanate resin and weight ratio of resin to additive will provide a cured adhesive with a relatively high crosslink density.

A catalyst such as dibutyltin diluarate (T-12) can also be used to reduce the mix viscosity and promote compatibility of the resin and additive during misting or wetting of the wood strands. If used, the catalyst is generally present in an amount from 0.02% to 0.25% by weight.

One noted advantage provided by adhesive composition of the invention is the facilitation of release of the pressed OSB from the platen. In other words, because the additive is inherently a hydrophobic oil, the additive can provide a releasing characteristic to the pressed OSB.

An adhesive composition that also works particularly well as a bonding system for OSB manufacturing comprises one or more polyisocyanate resins and castor oil without any secondary triglyceride present. However, if a secondary triglyceride is not used, the respective amount of resin to castor oil must be defined by a weight ratio from about 3:2 to about 2:3, thereby providing a calculated NCO:OH ratio from about 3:1 to about 1:5:1. The amount of adhesive composition used during OSB manufacture is from 1% to 10% by weight relative to the amount of wood strands. Also, one or more polyisocyanate resins selected from diphenylmethane diisocyanate, polymethylene polyphenyl isocyanates, or polyphenylene diisocyanates should be used. The use of polymeric MDI or modified polymeric MDI in this adhesive composition is particularly preferred.

Adhesive compositions of the invention with relatively high final crosslink densities will typically provide greater performance. High final crosslink densities can be obtained by either increasing the hydroxyl functionality or decreasing the pMDI/additive weight ratio. Relative high crosslink densities are obtained from adhesive compositions of the invention with a 30/70 weight ratio, e.g., pMDI(Rubinate M):P8. At this ratio, the calculated NCO/OH equivalent ratio is 1.5/1 and the cured adhesive appeared from rubbery to solid. For the same reasons, an adhesive composition with a weight ratio of 1:1 is expected to perform better than an adhesive composition with a weight ratio of 3:1. However, the calculated NCO/OH equivalent ratio is not the only important characteristic of an adhesive system that is to be considered for making OSB composite panels.

For relatively high OSB performance, the adhesive should be uniformly distributed on the wood fibers or materials. In other words, the adhesive must have a working viscosity that permits the adhesive to mist so as to thoroughly wet the wood fibers or strands in the OSB manufacturing process. Compatibility, or relatively low phase separation, between the pMDI resin and the oil or glyceride additive is also important. To enhance the compatibility between the pMDI and additive a catalyst such as dibutyltin diluarate (T-12) can be used.

The adhesive compositions of the invention can be used in a process of making wood composites. In one embodiment, the adhesive compositions of the invention can be used to make wood composites, e.g., OSB board or pressed structural lumber or panels.

In another embodiment, the adhesive compositions of the invention can be used in a process of making composites using synthetic fibers. In one embodiment, the adhesive compositions of the invention can be combined with organic polymers selected from polyacrylonitrile, aromatic polyamides, aliphatic polyamides, polyesters, poly(vinyl chloride), and poly(vinyl alcohol) and combinations thereof. In another embodiment, the adhesive compositions of the invention can be combined an inorganic material selected from glass, metal, and ceramic.

The invention and its benefits will be better understood with reference to the following examples. These examples are intended to illustrate specific embodiments within the overall scope of the invention as claimed, and are not to be understood as limiting the invention in any way.

EXAMPLE 1

Preparation of Additives, D1 to D16

The components listed in Table 1 with the exception of the lithium acetate catalyst are added to a three-neck round bottom reaction flask. The mixture is heated and stirred in a nitrogen environment. As the temperature of the reaction mixture reaches about 240° C., the lithium acetate catalyst is added. The reaction mixture is heated at a temperature between 240° C. to 250° C. for an additional 30 minutes to one hour. The reaction is monitored by the hot methanol test.

The hot methanol test is used to monitor the progress of the transesterification reaction. At high temperatures, e.g., 240° C., the oils are insoluble in anhydrous methanol while the monoesters are soluble. As a result, when one part volume of reaction mixture is mixed with 1 to 3 part volumes of anhydrous methanol and the result is a clear solution, this is an indication that the majority of the reaction products have one or two hydroxyl groups. At this point the reaction is stopped by cooling the reaction mixture. Once cooled sufficiently, the reaction product is unloaded.

EXAMPLE 2

Preparation of Additives, P8 to P12

Adhesive additives are prepared by mixing a given amount of castor oil and soybean oil. The components used to prepare each additive are provided in Table 2 with their respective calculated hydroxyl functionality. For example, the additive P8 is prepared by mixing 64 parts castor oil with 36 parts soybean oil to provide a calculated OH functionality of about 1.9. P12 is castor oil with no soybean oil.

TABLE 1

| Additive | Soybean oil g. | Canola oil g. | Castor oil g. | PE g | LiOAc g | OH calc. functionality |
|---|---|---|---|---|---|---|
| D1 | 300 | | | 41.7 | 0.05 | 1.9 |
| D2 | 300 | | | 46.4 | 0.05 | 2.0 |
| D3 | 300 | | | 54.9 | 0.05 | 2.1 |
| D4 | 300 | | | 61.0 | 0.05 | 2.3 |
| D5 | | 346 | 69 | 42.8 | 0.1 | 2.0 |
| D6 | | 346 | 102 | 40.1 | 0.1 | 1.9 |
| D7 | | 346 | 76.4 | 25 | 0.05 | 1.5 |
| D8 | 242 | | 183 | 45.5 | 0.05 | 2.4 |
| D9 | | 346 | | 48.4 | 0.1 | 1.9 |
| D10 | | 346 | | 43.8 | 0.1 | 1.8 |
| D11 | | 346 | | 39.5 | 0.1 | 1.7 |
| D12 | | 346 | | 35.7 | 0.1 | 1.6 |
| D13 | 346 | | 102 | 40.1 | 0.05 | 1.9 |
| D14 | 346 | | 76.4 | 25 | 0.05 | 1.5 |
| D15 | 346 | | 176.5 | | 0.05 | 1.0 |
| D16 | 346 | | 70 | | 0.05 | 0.5 |

TABLE 2

| Additive | Castor oil | Soybean oil | OH calc. functionality |
|---|---|---|---|
| P8 | 64 | 36 | 1.9 |
| P9 | 50 | 50 | 1.5 |
| P10 | 34 | 66 | 1.0 |
| P11 | 17 | 83 | 0.5 |
| P12 | 100 | 0 | 3.0 |

EXAMPLE 3

Finger Joint Performance

Adhesive compositions of the invention and comparative example compositions (controls) were tested in a finger joint application test. The adhesive is applied to both fingers of 2"×4" or 2"×3" black spruce fir. The glued joint is clamped under pressure (350 psi) for 15 seconds, and cured in an oven at 70° C. overnight. After three days standing at ambient temperature, the finger joints were cut into 1.5"× ¼"×12" specimens for the tension test. The specimens were tested under dry conditions, vacuum-pressure, and two-cycle boil tests.

The tests used to monitor tension strength of adhesives for finger joint lumber are a modified (ASTM D/4688) test as follows. In the dry test, the finger jointed specimens are tested to determine the tension strength and wood failure. In the two-cycle boil test, specimens are placed in a tank of boiling water for 4 hr, then allowed to dry for 20 hr at 63±3° C. with sufficient air circulation to lower the moisture content (MC) of the specimens to the original MC. The boil/dry cycle is repeated. The specimens are cooled in running water for 1 hr and tested wet within 1 hr. In the vacuum-pressure test, specimens are placed and soaked in water in a pressure vessel at 18° C. to 27° C. A vacuum of at least 25 in. Hg is applied for 30 minutes. Following vacuum treatment, a pressure of 75±2 psi is applied to the specimens for 2 hrs. The specimens are removed from the water and tested wet within 1 hr.

The summarized data of Tables 3 and 4 is obtained from adhesive compositions prepared from Rubinate M at weight ratios of 3:1 and 1:1, respectively. As the data indicates, many adhesive compositions of the invention out-performed the controls in strength and wood failure, that is, Rubinate M and Mondur MRS without additive, and Rubinate M with two types of linseed oil. At a weight ratio of 3:1, the calculated NCO/OH equivalent ratio is about 10/1 to about 13/1 depending on the hydroxyl functionality. As a result, there is excess pMDI present in the adhesive at this ratio, which can lead to cured adhesive with a low crosslink density. In contrast, at a weight ratio of 1:1 (Table 4), the presence of excess pMDI is substantially reduced. The calculated NCO/OH equivalent ratio is 3.5/1 to 4.5/1 depending on the hydroxyl functionality. As indicated in the data of Table 4, as the hydroxyl functionality increased from 1.5 to 3.0 (castor oil), performance of the adhesive improves.

TABLE 3

Finger Joint Performance.
Rubinate M/additive at weight ratio of 3:1.
Substrate: Black spruce fir

| Additive | Dry, psi | Vacuum pres., psi | Two-Cycle Boil, psi |
|---|---|---|---|
| Castor oil (P12) | 3165 ± 318 | 2132 ± 793 | 1815 ± 596 |
| | (37 ± 38) | (11 ± 19) | (19 ± 24) |
| D6 | 3350 ± 0 | 2123 ± 503 | 1766 ± 600 |
| | (5 ± 0) | (15 ± 7) | (6 ± 3) |
| D7 | 5003 ± 721 | 3228 ± 230 | 3070 ± 191 |
| | (23 ± 18) | (40 ± 30) | (18 ± 16) |
| D8 | 4290 ± 1870 | 2651 ± 1783 | 2754 ± 1264 |
| | (67 ± 33) | (55 ± 52) | (52 ± 42) |
| P8 | 4865 ± 897 | 3592 ± 921 | 4058 ± 832 |
| | (88 ± 13) | (49 ± 34) | (46 ± 22) |

TABLE 3-continued

Finger Joint Performance.
Rubinate M/additive at weight ratio of 3:1.
Substrate: Black spruce fir

|  | Dry, psi | Vacuum pres., psi | Two-Cycle Boil, psi |
|---|---|---|---|
| P9 | 5815 ± 2145 (85 ± 17) | 4048 ± 302 (70 ± 26) | 3809 ± 507 (28 ± 22) |
| Controls |  |  |  |
| Linseed oil (ADM) | 5722 ± 1270 (32 ± 46) | 3302 ± 275 (5 ± 0) | 3625 ± 268 (8 ± 4) |
| Linseed oil (Cargill) | 4311 ± 238 (100 ± 0) | 3166 ± 0 (25 ± 0) | 3016 ± 0 (5 ± 0) |
| Rubinate M | 2585 ± 195 (7 ± 3) | 2398 ± 268 (7 ± 3) | 2731 ± 829 (40 ± 52) |
| Mondur MRS | 3586 ± 422 (22 ± 16) | 2264 ± 465 (5 ± 0) | 2318 ± 468 (10 ± 7) |

Note:
Rubinate M is a polymeric MDI from Huntsman (% NCO = 31.5%, average functionality of 2.7, with viscosity of 250 cps at 25° C.).
Mondur MRS is a polymeric MDI from Bayer (% NCO = 31.5, average functionality of 2.5–2.7, with the viscosity of 200 cps at 25° C.).

TABLE 4

Finger Joint Performance.
Rubinate M/additive at weight ratio of 1:1.
Substrate: Black spruce fir

|  | Dry, psi | Vacuum pres., psi | Two-Boil, psi |
|---|---|---|---|
| Additive |  |  |  |
| Castor oil (P12) | 7570 ± 1094 (93 ± 4) | 4046 ± 1273 (86 ± 9) | 4161 ± 254 (63 ± 46) |
| D6 | 5533 ± 1875 (8 ± 4) | 2612 ± 1533 (14 ± 28) | 2634 ± 1094 (5 ± 0) |
| D7 | 3720 ± 653 (9 ± 9) | 2264 ± 393 (4 ± 5) | 2322 ± 267 (5 ± 0) |
| D8 | 5070 ± 1085 (20 ± 14) | 4026 ± 234 (60 ± 53) | 2577 ± 941 (5 ± 4) |
| P8 | 5104 ± 519 (78 ± 22) | 4000 ± 0 (100 ± 0) | 3298 ± 474 (30 ± 7) |
| P9 | 4656 ± 929 (70 ± 25) | 4122 ± 0 (95 ± 0) | 3931 ± 245 (77 ± 40) |
| Controls |  |  |  |
| Linseed oil (ADM) | 3746 ± 1098 (37 ± 42) | 2537 ± 331 (3 ± 3) | 2545 ± 201 (8 ± 5) |
| Linseed oil (Cargill) | 3803 ± 616 (25 ± 24) | 2069 ± 849 (0 ± 0) | 1915 ± 796 (5 ± 0) |
| Rubinate M | 2585 ± 195 (7 ± 3) | 2398 ± 268 (7 ± 3) | 2731 ± 829 (40 ± 52) |
| Mondur MRS | 3586 ± 422 (22 ± 16) | 2264 ± 465 (5 ± 0) | 2318 ± 468 (10 ± 7) |

EXAMPLE 4

ASTM D-5751 Test and Performance

Face lamination tests (ASTM D5751) were conducted on high density, half-inch thick Douglas fir. The adhesive laminated boards are hot-pressed at 200° F. overnight and tested 3 days after standing at ambient temperature. Data shown in Tables 5 and 6 are performance results of sample adhesives of the invention prepared from Rubinate M at a weight ratio of 1:1. The collected data indicates that P8 performs better than the control (Rubinate M), and better than most of the other adhesives of the invention. The data also suggests that as the calculated hydroxyl functionality increased from f=0.5 to f=1.9 in the castor/soybean oil additives, performance increased.

TABLE 5

ASTM D-5751 Performance.
Rubinate M/additive at weight ratio of 1:1.
(Cured in oven at 200° F. for 24 hours.)

| Additive | Specific gravity | Dry, psi | Vacuum pres., psi | 2-Cycle-Boil, psi |
|---|---|---|---|---|
| Rubinate M (Control) | 0.52–0.63 | 1532 ± 143 (95 ± 7) | 761 ± 70 (34 ± 8) | 716 ± 94 (36 ± 12) |
| D6 | 0.54–0.59 | 1236 ± 33 (55 ± 35) | 734 ± 82 (22 ± 6) | 315 ± 143 (8 ± 3) |
| D7 | 0.58–0.51 | 1236 ± 193 (38 ± 4) | 694 ± 56 (10 ± 7) | 279 ± 156 (9 ± 4) |
| P8 | 0.54–0.60 | 1436 ± 136 (73 ± 39) | 792 ± 114 (24 ± 11) | 560 ± 156 (8 ± 4) |
| P9 | 0.58–0.51 | 1526 ± 87 (78 ± 4) | 865 ± 123 (33 ± 8) | 467 ± 152 (27 ± 10) |
| P10 | 0.57–0.58 | 1406 ± 87 (75 ± 35) | 432 ± 304 (9 ± 7) | 231 ± 172 (7 ± 3) |
| P11 | 0.57–0.55 | 840 ± 530 (10 ± 7) | 801 ± 187 (7 ± 3) | 134 ± 95 (6 ± 2) |
| Rubinate M (Control) | 0.58–0.52 | 1331 ± 177 (88 ± 16) | 786 ± 54 (42 ± 19) | 546 ± 118 (31 ± 16) |

TABLE 6

ASTM D-5751 Performance.
Rubinate M/Additive at weight ratio of 1:1.
Hot press (200° F.) overnight

|  | Vac-Pressure | | 2-Cycle Boil | |
|---|---|---|---|---|
| Additive | Strength (psi) | Wood failure (%) | Strength (psi) | Wood failure (%) |
| D6 | 783 ± 54 | 24 ± 20 | 145 ± 43 | 8 ± 3 |
| D7 | 778 ± 124 | 10 ± 5 | 290 ± 30 | 5 ± 0 |
| P8 | 1001 ± 88 | 27 ± 7 | 566 ± 170 | 33 ± 16 |
| P9 | 879 ± 71 | 16 ± 9 | 268 ± 126 | 13 ± 6 |
| P10 | 873 ± 68 | 23 ± 10 | 305 ± 88 | 16 ± 9 |
| Soybean oil (control) | 698 ± 239 | 13 ± 6 | 242 ± 132 | 13 ± 6 |
| Rubinate M (control) | 652 ± 312 | 28 ± 23 | 444 ± 63 | 30 ± 4 |

EXAMPLE 5

Viscosity of Adhesive Compositions at Different Weight Ratios

Brookfield viscosity measurements on adhesive compositions of the invention were conducted to investigate the compatibility of the additives of the invention with pMDI resin A small portion of prepared adhesive composition is poured into one-ounce vials for observation. Adhesive compositions with a pMDI:additive weight ratio of 3:1 provide a homogeneous mix product, while adhesive compositions with a weight ratio of 1:1 tend to phase separate after 24 hours.

Table 7A is a summary of Brookfield viscosity data in (cps) of various adhesive compositions of the invention. The compositions are hand mixed for 30 seconds, and the viscosity was measured at one minute and 24 hrs after mixing.

The data of Table 7A suggests that as the weight ratio pMDI:additive increases from 70:30 to 90:10, the viscosity measured at 24 hours decreased about an order of magnitude. It is believed that the lower observed viscosity after 24 hours in the adhesive compositions with higher resin concentrations is due to more pMDI in the adhesive compositions, which results in the formation of low molecular weight, cured polyurethane.

As the weight ratio of pMD/additive decreases toward the calculated NCO/OH equivalent ratio of 1/1, crosslink density increases. The led to the cured adhesive with rubbery to solid appearance.

Viscosity measurements were also conducted on the adhesive compositions from 1 to 10 minutes after mixing. The viscosity of the adhesive compositions of the invention at 1 to 3 minutes after mixing of the polyisocyanate resin and the adhesive additive is defined as the application viscosity. Interestingly, adhesive compositions with a weight ratio of 3:1 consistently exhibited a relatively high application viscosity than adhesives with a 1:1 weight ratio (Table 7B). One reason for this effect could be the formation of an unstable emulsion having oil particles surrounded by pMDI particles. As the data in Table 7A suggests, as the weight ratio decreased from 100:0, the application viscosity progressively increased until a weight ratio of 30:70. Rubinate M/castor oil (P12) at 1:1 provides a homogeneous clear solution (Table 7B), but layer separation occurred when Rubinate M was mixed with transesterification products with lower calculated hydroxyl functionality such as f=1.0, or 0.5, and particularly with soybean oil.

TABLE 7A

Brookfield Viscosity at Various Weight Ratios.

| Rubinate M/Additive Mix ratio | | D13 | P8 |
|---|---|---|---|
| Wt. ratio | NCO/OH equivalent ratio | 24 hrs (a) cps | 24 hrs (a) cps |
| 100/0 | | 320 | 320 |
| 90/10 | 31.1/1 | 600 | 650 |
| 80/20 | 13.9/1 | 1900 | 2050 |
| 70/30 | 8.1/1 | 5050 | 6750 |
| 60/40 | 5.2/1 | 36000 | 79800 |
| 50/50 | 3.5/1 | 328000 | 220000 |
| 40/60 | 2.3/1 | Rubbery | Rubbery |
| 30/70 | 1.5/1 | Rubbery | Solid |
| 20/80 | 0.9/1 | 37800 | Rubbery |
| 10/90 | 0.4/1 | 600 | 2450 |
| 0/100 | | 140 | 200 |

(a) Measured by #6 spindle at 2.5 to 10 rpm.

TABLE 7B

Brookfield Viscosity (cps) at two minutes.*

| Additive | 1:1 | 3:1 |
|---|---|---|
| D13 | 260 (poor) | 560 (good) |
| D14 | 180 (poor) | 500 (good) |
| D15 | 220 (poor) | 260 (good) |
| D16 | 180 (poor) | 220 (poor) |
| P8 | 240 (poor) | 480 (good) |
| P9 | 160 (poor) | 300 (good) |
| Castor oil (P12) | 720 (good) | 980 (good) |
| Soybean oil (control) | 60 (poor) | 180 (poor) |

*Compatibility is reported in parentheses.

TABLE 8

Calculated NCO/OH Equivalent Ratio of adhesive compositions.

| Additive | pMDI/castor oil weight ratio | NCO/OH equivalent ratio | OH functionality in hydroxyl bearing oil |
|---|---|---|---|
| At Rubinate M/additive at 1:1 weight ratio | | | |
| P8 (f = 1.9) | 50/32 | 3.45/1 | 3 |
| D13 (f = 1.9) | 50/50 | 3.48/1 | 1.9 |
| P9 (f = 1.5) | 50/25 | 4.41/1 | 3 |
| D14 (f = 1.5) | 50/50 | 4.41/1 | 1.5 |
| At Rubinate M/additive at 3:1 weight ratio | | | |
| P8 (f = 1.9) | 150/32 | 10.33/1 | 3 |
| D13 (f = 1.9) | 150/50 | 10.45/1 | 1.9 |
| P9 (f = 1.5) | 150/25 | 13.23/1 | 3 |
| D14 (f = 1.5) | 150/50 | 13.23/1 | 1.5 |

*Rubinate M has a NCO equivalent weight of 133 g/eq.

Adhesive compositions of the invention that exhibit relatively high performance is achieved by increasing the crosslink density of the cured binder. An increase in crosslink density can be accomplished by either increasing the hydroxyl functionality or decreasing the pMDI:additive weight ratio. A relatively high crosslink density is observed with a pMDI:additive weight ratio of 30:70, f=1.9 (Table 7A). At this ratio, the calculated NCO/OH equivalent ratio is 1.5/1 and the cured adhesive appeared from rubbery to solid. Adhesive compositions of the invention prepared from castor oil and soybean oil blends (P8 and P9) provided better performance than the transesterification product (D6 & D7, Tables 3 to 6) at the same calculated hydroxyl functionality because of the a higher crosslink density in the former. A simple calculation based on the assumption that NCO exclusively reacts with the hydroxyl bearing oil is shown in Table 8. It can be seen that at the same pMDI/oil additive mix ratio (1/1 or 3/1), both the transesterification product and the castor oil and soybean oil blend give the same calculated NCO/OH equivalent ratio. However, the castor oil and soybean oil blend would give a cured adhesive with a higher crosslink density than the reacted oil derivative because of the higher OH functionality. Similarly, for a given pMDI:additive system a weight ratio of 1:1 is expected to perform better than the same adhesive system with a weight ratio of 3:1 for the same reason. However, it will be shown in the later examples that an even more important consideration for the OSB performance is the adhesive distribution and the molecule association between pMDI and the additive molecule during misting process.

EXAMPLE 6

Manufacture of OSB Composite Panels

OSB composite panels were produced using the adhesive compositions of the invention. A portion of the pMDI was replaced with a castor oil/soybean oil additive or a transesterified additive of the invention. OSB composite panels were also produced using adhesive systems (pMDI, BASF M20SB, and two linseed oil adhesives) for comparison. pMDI (BASF M20SB) was mixed with adhesive additives of the invention at two weight ratios, i.e., 1:1 and 3:1. The adhesive compositions were added to the wood product at 2% binder level.

The wood product manufacturing process includes blending 20 kg of Aspen OSB strands (10% fine at 2.8% MC) in sequence with water (so that total MC %=5%), wax (1%), adhesive additive, and pMDI to make three OSB panels. The total binder loading is based on the total dry weight of the strands. The pMDI and the adhesive additive are hand mixed 2–3 minutes before misting through a spinning disk atomizer at 12,000 RPM inside of a rotating blender at about 20 RPM. The total blending process takes about 10–12 minutes. After the blending is complete, the loose strands are manually placed into a 4'×4' wooden box container to form 4" thick loose OSB strands before pressing at 400° F. for 3 minutes. After standing at ambient temperature for one week, the OSB panels were tested.

OSB panel test results are summarized in Tables 9. It should be noted that modulus of rupture (MOR), modulus of elasticity (MOE), and the bond durability (MOR after 2 hrs of water soak) are based on an average of 9 specimens, internal bond (IB) is based on an average of 18 specimens, and thickness swell (TS) is based on an average of 6 specimens. As indicated in the data of Table 9, the adhesive composition of the invention that exhibits optimal performance is P8.

TABLE 9

OSB Performance of adhesives at a weight ratio of 1:1.

| Additive | MOR (psi) | MOE (psi × 1000) | IB (psi) | MOR after 2 hr Soak | TS (%) | L. Expan. (%) |
|---|---|---|---|---|---|---|
| pMDI (M20SB) | 4300 | 674 | 57.4 | 1980 | 12.9 | 0.33 |
| Castor oil (P12) | 4360 | 646 | 55.2 | 1550 | 14.0 | 0.35 |
| D13 (f = 1.9) | 3900 | 662 | 56.0 | 1300 | 12.8 | 0.38 |
| D14 (f = 1.5) | 3360 | 593 | 51.2 | 1100 | 15.0 | 0.39 |
| Linseed oil (ADM) | 3540 | 656 | 45.3 | 1240 | 14.6 | 0.36 |
| Linseed oil (Cargill) | 3660 | 667 | 58.2 | 1040 | 14.9 | 0.36 |
| P8 (f = 1.9) | 4700 | 661 | 85.0 | 1850 | 11.4 | 0.36 |

PMDI (M20SB) is from BASF.

Optimized performance for an OSB adhesive system necessitates the balancing of various characteristics of the adhesive composition, i.e., adhesive distribution, compatability, and final crosslink density of the cured adhesive. First, the adhesive composition should be sufficiently and uniformly distributed onto the surface of the strands during application. In the industry, this is typically performed with a high speed (12,000 rpm) spinning disk atomizer. Optimal atomization and flexibility in atomization control generally requires an adhesive composition with a relatively low viscosity. The difference in performance between pMDI/P12 and pMDI/P8 or pMDI/P9 with a 1:1 weight ratio is believed to be due to the relatively high application viscosity (720 cps, Table 7B) of the P12 adhesive composition, which can interfere with adhesive distribution. In contrast, the adhesive compositions prepared with P8 and P9 at a weight ratio of 1:1 exhibit application viscosities of 240 cps and 160 cps, respectively.

Second, compatibility of the pMDI resin and adhesive additive of the invention is important for an OSB binding system. Compatibility is particularly important after the adhesive composition is applied, e.g., misted onto the surface of the strands. The pMDI and adhesive additive must remain relatively homogeneous, that is without appreciable phase separation, to obtain sufficient crosslink density in the cured adhesive. This is particularly important when the binder level is at 3% or lower. On the other hand, if pMDI and the adhesive additive phase separate during the misting process, the opportunity for pMDI and additive to react during the hot press step is diminished. Because it is believed that pMDI has a greater affinity toward castor oil than soybean oil, the pMDI molecules preferentially associate with the castor oil and deposit onto the surface of the loose strands. Consequently, the crosslinking reaction between pMDI with castor oil result in the formation of a cured adhesive with high crosslink density.

EXAMPLE 7

Adhesive Compositions with D13 and P8

Data of Table 10A summarizes Brookfield Viscosity data for adhesive compositions of the invention containing additive D13 or P8 at different weight ratios with and without 0.1% catalyst (T-12). Adhesive compositions with D13 at weight ratios of 3:1 and 2:1 exhibit a relatively high application viscosity than the same adhesive compositions with catalyst. Adhesive composition with P8 at a weight ratio of 3:1 also exhibits a relatively high application viscosity than the same adhesive compositions with catalyst. Adhesive composition with P8 at a weight ratio of 2:1 exhibited a slightly higher application viscosity with catalyst, however at one minute the application viscosity was in fact lower with catalyst. The data provided in Table 10A suggests that a catalyzed adhesive composition system is expected to provide greater OSB performance because of the lower initial mix viscosity, which leads to better adhesive distribution and greater compatibility.

TABLE 10A

Brookfield Viscosity (cps) at 2 min.

| | Weight ratio | | | | |
|---|---|---|---|---|---|
| | 3:1 | 2:1 | 1:1 | 1:2 | 1:3 |
| Rubinate M/P8 | 520 | 380 | 320 | 240 | 220 |
| Rubinate M/P8 with catalyst | 380 | 460 | 600 | 1180 | 440 |
| Rubinate M/D13 | 620 | 740 | 220 | 140 | 140 |
| Rubinate M/D13 with catalyst | 280 | 180 | 380 | 6360 | 1760 |

It was observed that during the initial mixing of the catalyzed pMDI/D13 (and pMDI/P8) system, the adhesive composition turned into a clear, amber, solution within 1–2 minutes. Apparently, there is an initial reaction between pMDI and the adhesive additive to form homogeneous, low molecular weight polyurethane.

Comparison of the pMDI/D13 data to the pMDI/P8 data of Table 10A suggests that the pMDI reaction with P8 is faster than the reaction between pMDI and D13. It is important to note that the catalyzed system provided a lower application viscosity than the non-catalyzed system at 3:1 and 2:1 ratios. This should benefit the adhesive distribution during the high speed misting through the spinning disk atomizer. The catalyzed system turns into a homogeneous, clear solution due to the initial reaction within 1–2 minutes. This observed compatibility ensures close molecular association between pMDI and additive. As a result, the catalyzed system is expected to provide high OSB performance because of better adhesive distribution and greater compatibility.

If a catalyzed adhesive composition is used in OSB application, 50% replacement of pMDI, i.e., a weight ratio of 1:1, is likely to be the upper limit for OSB application. As the weight ratio goes beyond 1:1 such as 1:2 or 1:3, the speed of reaction becomes too fast and the viscosity increase is too rapid to be applicable during the manufacture of OSB processing. In other words, the adhesive composition cures too quickly, and precludes adequate distribution or wetting of the wood strands.

EXAMPLE 8

Exothermic Temperature Measurement

To further understand the curing behavior of the adhesive compositions of the invention, temperature measurements of the adhesive compositions at different weight ratios were conducted. The temperature data is summarized in Table 10B. As the hydroxyl functionality of the additive increased, there was a corresponding increase in exothermic temperature. Adhesive compositions containing weight ratios of pMDI:castor oil from 1:1 to 1:3 provide the largest rate of exotherm.

Adhesive compositions with castor oil and soybean oil (P8 & P9) consistently exhibited a higher exotherm temperature than adhesive compositions with transesterified additive (D13 and D14) with the same hydroxyl functionality. One possible reason for this observation is that pMDI has a greater affinity for castor oil than soybean oil. This proposition is consistent with the observation that when pMDI is mixed with castor oil at a weight ratio of 1:1, a homogeneous clear mixture is observed. In contrast, adhesive compositions with pMDI mixed with soybean oil at a weight ratio of 1:1 provides a phase separated product. The data is consistent with the proposition that a homogeneous mixture should provide a faster rate of reaction than a heterogeneous mixture. The transesterified additives of the invention are not as compatible with pMDI as castor oil. As a result, a less exothermic temperature is observed with these additives. The exotherm data helps explain the greater crosslink density observed in the adhesive composition with castor oil/soybean oil sample (P8) than the transesterified additive (D13) at all weight ratios.

ratios with and without catalyst. Data provided in Table 12 is obtained using adhesive compositions of the invention containing Rubinate M/P8 at the same weight ratios with and without catalyst. It should be noted that since the catalyzed system cured faster than the non-catalyzed system, a shorter closed assembly time (CAT) had to be used. Upon review of the data of Tables 11 and 12, the following conclusions can be made:

1. Generally, the Rubinate M/P8 adhesive compositions performed better than the Rubinate M/D13 adhesive compositions at all ratios with or without catalyst;
2. Catalyzed and non-catalyzed adhesive compositions generally provide similar degrees of performance; and
3. There is a performance drop if the Rubinate M/D13 (or P8) weight ratio is lower than 1:1, with or without catalyst.

The first conclusion is to be expected as previously indicated in Tables 4 and 6. The second conclusion is consistent with the observation that adhesive distribution is not as an important factor as it is in OSB because the wetting requirements of the laminated boards is this test is quite different than in OSB.

In summary, the collected and tabulated data for the adhesive compositions of the invention out-perform the controls, that is, neat pMDI (Rubinate M and Mondur MRS). Results of OSB application also indicated that it out-performed the pure pMDI at the same binder level. This suggests that the adhesive compositions of the invention are suitable for bonding plywood, waferboard, chipboard, fiberboard, particleboard, oriented strand board (OSB), or any other wood products derived from cellulose fiber.

TABLE 10B

ExothermicTemperature Measurements.
Rubinate M/additive at Different Weight Ratios

| Time (min) | Castor oil (° C.) | | D13 (f = 1.9) (° C.) | | D14 (f = 1.5) (° C.) | | P8 (f = 1.9) (° C.) | | P9 (f = 1.5) (° C.) | |
|---|---|---|---|---|---|---|---|---|---|---|
| | 1/1 | 3/1 | 1/1 | 3/1 | 1/1 | 3/1 | 1/1 | 3/1 | 1/1 | 3/1 |
| 1 | 24.5 | 24.5 | 24 | 24.5 | 24 | 24 | 24.5 | 24 | 24.5 | 24.5 |
| 5 | 28 | 26 | 26 | 24.5 | 25.5 | 24.5 | 27.5 | 26.5 | 26.5 | 25.5 |
| 10 | 31.5 | 28 | 26.5 | 25 | 26 | 25 | 29 | 27.5 | 28 | 26.5 |
| 15 | 33.5 | 29.5 | 27.5 | 26 | 26.5 | 25.5 | 30.5 | 28 | 30 | 27 |
| 20 | 35 | 31 | 28 | 26 | 27 | 26 | 31.5 | 28.5 | 30.5 | 27 |
| 25 | 35.5 | 31.5 | 29 | 26 | 27.5 | 26 | 32 | 29 | 31 | 28 |
| 30 | 36.5 | 32 | 29 | 26 | 27.5 | 26.5 | 32 | 29.5 | 31 | 28.5 |

EXAMPLE 9

ASTM D-5751 Performance

Adhesive compositions were tested to determine their respective performance with respect to a face lamination application. The wood product is Douglas Fir (Sp. Gr.=0.52–0.55, MC=6–8%, Laminated Boards were Cured at 200° F. for 24 hrs). Data provided in Table 11 is obtained using adhesive compositions of the invention containing Rubinate M/D13 at weight ratios of 3:1, 2:1, 1:1, 1:2 and 1:3

TABLE 11

ASTM D-5751 Rubinate M/D13 at different weight ratios.

| weight ratio | Sp.Gr. boards | CAT (min) | Dry, psi (wf %) | Vac-Pressure, psi (wf %) | 2-Cycle Boil, psi (wf %) |
|---|---|---|---|---|---|
| No catalyst | | | | | |
| 3:1 | 0.55–0.55 | 27 | 1244 (70) | 712 (31) | 338 (26) |
| 2:1 | 0.55–0.54 | 24 | 1376 (78) | 704 (40) | 269 (23) |
| 1:1 | 0.54–0.56 | 21 | 1279 (83) | 523 (11) | 223 (7) |

| | | | | | |
|---|---|---|---|---|---|
| 1:2 | 0.53–0.55 | 18 | 972 (26) | 472 (9) | All failed |
| 1:3 | 0.53–0.55 | 15 | 883 (16) | 464 (6) | All failed |
| Rubinate M | 0.52–0.56 | 30 | 1030 (20) | 569 (10) | 271 (14) |
| Mixture containing 0.1% T-12 | | | | | |
| 3:1 | 0.54–0.55 | 15 | 1343 (48) | 623 (55) | 454 (34) |
| 2:1 | 0.54–0.56 | 12 | 1305 (70) | 622 (22) | 318 (19) |
| 1:1 | 0.54–0.56 | 8 | 1247 (78) | 529 (11) | 277 (8) |
| 1:2 | 0.53–0.57 | 4 | 279 (8) | 190 (1) | All failed |
| 1:3 | 0.53–0.57 | 2 | 302 (8) | 39 (1) | All failed |
| Rubinate M | 0.55–0.57 | 20 | 1175 (80) | 609 (43) | 379 (25) |

Rubinate M does not contain catalyst.
Dry data is based on an average of 2 specimens, and wet data is based on an average of 7 specimens.

TABLE 12

ASTM D-5751 Rubinate M/P8 at different weight ratios.

| Weight ratio | Sp.Gr. boards | CAT (min) | Dry, psi (wf %) | Vac-Pressure, psi (wf %) | 2-Cycle Boil, psi (wf %) |
|---|---|---|---|---|---|
| No catalyst | | | | | |
| 3:1 | 0.52–0.53 | 27 | 1236 (88) | 715 (25) | 451 (24) |
| 2:1 | 0.50–0.52 | 24 | 1200 (85) | 768 (21) | 445 (34) |
| 1:1 | 0.52–0.54 | 21 | 1340 (80) | 737 (33) | 525 (23) |
| 1:2 | 0.52–0.55 | 18 | 1256 (98) | 763 (21) | 398 (10) |
| 1:3 | 0.51–0.52 | 15 | 1256 (83) | 688 (13) | 216 (11) |
| Rubinate M | 0.52–0.54 | 30 | 1416 (65) | 757 (42) | 518 (22) |
| Mixture containing 0.1% T-12 | | | | | |
| 3:1 | 0.53–0.55 | 15 | 1334 (88) | 751 (64) | 389 (41) |
| 2:1 | 0.53–0.55 | 12 | 1315 (90) | 752 (31) | 451 (39) |
| 1:1 | 0.52–0.54 | 8 | 1101 (30) | 723 (30) | 563 (24) |
| 1:2 | 0.52–0.53 | 4 | 1216 (68) | 625 (25) | 245 (9) |
| 1:3 | 0.53–0.56 | 2 | 1291 (75) | 420 (9) | 186 (16) |
| Rubinate M | 0.53–0.55 | 20 | 991 (70) | 696 (50) | 562 (35) |

Rubinate M did not contain catalyst.
Dry data are based on an average of 2 specimens, and wet data are based on an average of 7 specimens.

EXAMPLE 10

Finger Joint Performance

Adhesive compositions of the invention and comparative example compositions (controls) were tested in a finger joint application test. The adhesive is applied to both fingers of 2"×4" or 2"×3" black spruce fir. The glued joint is clamped under pressure (350 psi) for 15 seconds, and cured in an oven at 70 to 100° C. overnight. After three days standing at ambient temperature, the finger joints were cut into 1.5"× ¼"×12" specimens for the tension test. The specimens were tested under dry conditions, vacuum-pressure, and two-cycle boil tests.

Data of Table 13 summarizes finger joint strength and wood failure of adhesive compositions prepared from pMDI (Mondur MRS) with and additive at a weight ratio of 2:1. The adhesive compositions also contain 0.1% T-12. Nearly all of the adhesive compositions exhibit similar or better wet performance than the controls, Mondur MRS and Mondur MRS with 0.1% dibutyltin dilaurate catalyst (T-12).

TABLE 13

Finger Joint Strength of MRS/Additive at a weight ratio of 2:1.
Substrate: 2" × 3" Black Spruce Fir

| | Dry | | Vac-pressure | |
|---|---|---|---|---|
| | Strength (psi) | WF % | Strength (psi) | WF % |
| Additive | | | | |
| D1 | 4595 ± 52 | 95 ± 0 | 3441 ± 603 | 39 ± 17 |
| D2 | 4237 ± 639 | 73 ± 32 | 2786 ± 396 | 72 ± 34 |
| D3 | 3507 ± 494 | 100 ± 0 | 4992 ± 1130 | 65 ± 5 |
| D4 (Control) | 4902 ± 1982 | 85 ± 0 | 5887 ± 533 | 63 ± 23 |
| Mondur MRS | 3668 ± 226 | 100 ± 0 | 2770 ± 607 | 70 ± 17 |
| Mondur MRS (0.1% T-12) | 5720 ± 1503 | 95 ± 0 | 3319 ± 50 | 63 ± 20 |

Dry test was based on an average of 2 specimens (1" × ¼").
Wet test was based on an average of 6 specimens (1" × ¼").

EXAMPLE 11

Finger Joint Performance

Data of Table 14 summarizes finger joint strength of adhesive compositions prepared from the catalyzed (MRS)/ (D2) at different weight ratios (from 70/30 to 30/70) cured in an oven at 100° C. overnight. The data suggests the best performing adhesive has a weight ratio of 60/40 to 40/60. At a weight ratio 30/70, a drop in performance is observed because it is believed that part of the NCO groups in the adhesive mix also react with moisture in wood. This leads to the deficiency of NCO group in the adhesive mix at 30/70 (the calculated NCO/OH equivalent is 1.22/1). Consequently, the apparent performance drop at a pMDI/additive weight ratio of 30/70 is likely due to a decrease in crosslinking density in the cured adhesive.

EXAMPLE 12

Finger Joint Performance

The data of Table 15 summarizes finger joint strength of adhesive compositions prepared from sequential replacement of pMDI(Rubinate M) with additive D5 without catalyst cured at 100° C. overnight. As indicated, replacement of as much as 50% of Rubinate M with additive D5 provided enhanced performance over the resin alone (control).

TABLE 14

Finger Joint Strength of MRS/D2.
(Cured in an Oven at 100° C. Overnight)
Substrate: 2" × 3" Black Spruce Fir

| Weight ratio MRS/D2 | Calc. NCO/OH Ratio | Dry Strength (psi) | WF % | Vac-pressure Strength (psi) | WF % |
|---|---|---|---|---|---|
| 70/30 | 6.67/1 | 4145 ± 195 | 83 ± 23 | 4440 ± 735 | 47 ± 16 |
| 60/40 | 4.29/1 | 5069 ± 2362 | 99 ± 3 | 3941 ± 1418 | 65 ± 18 |
| 50/50 | 2.86/1 | 5244 ± 1899 | 75 ± 19 | 3225 ± 1009 | 50 ± 30 |
| 40/60 | 1.90/1 | 3721 ± 478 | 80 ± 37 | 4009 ± 591 | 50 ± 44 |
| 30/70 | 1.22/1 | 1772 ± 652 | 4 ± 3 | 1030 ± 537 | 0 ± 0 |
| (Control) Mondur MRS | | 5741 ± 1057 | 99 ± 3 | 3872 ± 1172 | 68 ± 18 |

TABLE 14-continued

Finger Joint Strength of MRS/D2.
(Cured in an Oven at 100° C. Overnight)
Substrate: 2" × 3" Black Spruce Fir

| Weight ratio MRS/D2 | Calc. NCO/OH Ratio | Dry Strength (psi) | WF % | Vac-pressure Strength (psi) | WF % |
|---|---|---|---|---|---|
| (0.2% T-12) Mondur MRS (0.3% T-12) | | 6282 ± 1932 | 80 ± 14 | 4698 ± 934 | 87 ± 21 |

D2 contained 0.35% T-12.

TABLE 15

ASTM D-4688 Finger Joint Performance.
Rubinate M/D5 Substrate: Black Spruce Fir

| Weight ratio | Dry | | Vac/Pressure | |
|---|---|---|---|---|
| | Strength (psi) | Wood failure (%) | Strength (psi) | Wood failure (%) |
| (Rubinate M) | 3078 ± 915 | 71 ± 27 | 2198 ± 522 | 12 ± 4 |
| 80/20 | 4734 ± 1029 | 93 ± 14 | 2486 ± 707 | 68 ± 26 |
| 70/30 | 4558 ± 2091 | 83 ± 25 | 2654 ± 1052 | 61 ± 38 |
| 60/40 | 4527 ± 1080 | 98 ± 4 | 3673 ± 965 | 56 ± 33 |
| 50/50 | 3576 ± 1113 | 76 ± 28 | 3543 ± 1019 | 34 ± 40 |

6680-170 is an oil derivative from Canola oil, Castor oil, and PE.
All data were based on an average of 8 specimens (1" × ¼").

EXAMPLE 13

Finger Joint Performance

Date of Tables 16 and 17 summarize finger joint performances of adhesive compositions prepared from pMDI/additives at weight ratios of 3:1 and 1:1 cured at 100° C. overnight, respectively. In general, the data indicates that adhesive compositions of the invention performed equal or better than the two controls resins (Rubinate M and Mondur MRS).

TABLE 16

Finger Joint Performance.
Rubinate M/Additive at weight ratio 3:1.
Substrate: Black Spruce Fir

| Additive | Dry, psi (wf %) | Vac-Pressure, psi (wf %) | 2-Cycle Boil, psi (wf %) |
|---|---|---|---|
| D8 (FN = 2.4) | 4290 ± 1870 (67 ± 33) | 2651 ± 1783 (55 ± 52) | 2754 ± 1264 (52 ± 42) |
| D6 (FN = 1.9) | 3555 ± 0 (5 ± 0) | 2123 ± 503 (15 ± 7) | 1766 ± 600 (6 ± 3) |
| D7 (FN = 1.5) | 5003 ± 721 (23 ± 18) | 3228 ± 230 (40 ± 30) | 3070 ± 191 (18 ± 16) |
| (Control) | | | |
| Rubinate M | 2585 ± 195 (7 ± 3) | 2398 ± 268 (7 ± 3) | 2731 ± 829 (40 ± 52) |
| Mondur MRS | 3586 ± 422 (22 ± 16) | 2264 ± 465 (5 ± 0) | 2318 ± 468 (10 ± 7) |

TABLE 17

ASTM D-4688 Finger Joint Performance.
Rubinate M/Additive at 1:1 Weight Ratio.
Substrate: Black Spruce Fir

| Additive | Dry, psi (wf %) | Vac-Pressure, psi (wf %) | 2-Cycle Boil, psi (wf %) |
|---|---|---|---|
| D8 (FN = 2.4) | 5070 ± 1085 (20 ± 14) | 4026 ± 234 (60 ± 53) | 2577 ± 941 (5 ± 4) |
| D6 (FN = 1.9) | 5533 ± 1875 (8 ± 4) | 2612 ± 1533 (14 ± 28) | 2634 ± 1094 (5 ± 0) |
| D7 (FN = 1.5) | 3720 ± 653 (9 ± 9) | 2264 ± 393 (4 ± 5) | 2322 ± 267 (5 ± 0) |
| (Control) | | | |
| Rubinate M | 2585 ± 195 (7 ± 3) | 2398 ± 268 (7 ± 3) | 2731 ± 829 (40 ± 52) |
| Mondur MRS | 3586 ± 422 (22 ± 16) | 2264 ± 465 (5 ± 0) | 2318 ± 468 (10 ± 7) |

EXAMPLE 14

Face Lamination in ASTM D-5751 Test

Face lamination tests (ASTM D5751) were conducted on high density, half-inch thick Douglas fir. The adhesive laminated boards are hot-pressed at 200° F. overnight and tested 3 days after standing at ambient temperature. Data shown in Table 18 indicates that adhesive compositions of the invention pMDI (Rubinate M):D5 at a ratio of 1:1, performed equal or better than the resin alone and if the resin is mixed with just soybean oil for a given weight ratio. The relatively poor performance of soybean oil is attributed to lack of any hydroxyl functionality, and therefore lack of any enhanced crosslinking.

TABLE 18

ASTM D-5751 Performance.
Rubinate M/Additives at 1:1 weight ratio.
Substrate: Douglas Fir (Sp. Gr. = 0.58–0.59, MC = 8–10%)

| Additive | Dry | | Vac-Pressure | |
|---|---|---|---|---|
| | Strength (psi) | Wood failure (%) | Strength (psi) | Wood failure (%) |
| D5 (0.023% T-12) | 1959 ± 272 | 90 ± 11 | 1081 ± 96 | 27 ± 16 |
| soybean oil | 1788 ± 281 | 54 ± 21 | 932 ± 242 | 9 ± 4 |
| Rubinate M (Control) | 1468 ± 199 | 91 ± 10 | 1018 ± 99 | 31 ± 23 |

EXAMPLE 15

ASTM D-5751 Performance

Face lamination tests (ASTM D5751) were conducted on high density, half-inch thick Douglas fir. The adhesive laminated boards are hot-pressed at 200° F. overnight and tested 3 days after standing at ambient temperature. The data of Table 19 indicates that the adhesive compositions of the invention performed better than the control.

TABLE 19

ASTM D-5751 Performance.
Rubinate M/Additive at 3:1 weight ratio.
Substrate: Douglas Fir (Sp. Gr. = 0.55–0.56, MC = 8–10%)

| Additive (control) | Dry, psi (wf %) | Vac-Pressure, psi (wf %) | 2-Boil, psi (wf %) |
|---|---|---|---|
| Rubinate M | 1296 ± 779 (15 ± 7) | 555 ± 305 (4 ± 2) | 247 ± 75 (7 ± 3) |
| D8 (FN = 2.4) | 1916 ± 22 (90 ± 5) | 737 ± 79 (12 ± 3) | 358 ± 92 (12 ± 4) |
| D6 (FN = 1.9) | 1828 ± 83 (93 ± 3) | 920 ± 124 (13 ± 9) | 384 ± 194 (15 ± 4) |
| D7 (FN = 1.5) | 950 ± 104 (65 ± 5) | 603 ± 298 (8 ± 3) | 289 ± 97 (4 ± 2) |

EXAMPLE 16

ASTM D-5751 Performance

Face lamination tests (ASTM D5751) were conducted on high density, half-inch thick Douglas fir. The adhesive laminated boards are hot-pressed at 200° F. overnight and tested 3 days after standing at ambient temperature. The data of Table 20 indicates that if 50% of pMDI is replaced with additives, D9 to D12, a performance equal or better than the control (pMDI) is observed, except in regard to the two-cycle boil test.

EXAMPLE 17

Adhesive Compositions in OSB Production

OSB composite panels were produced using the adhesive compositions of the invention listed in Table 21. As indicated, a portion of the pMDI was replaced with a transesterified additive of the invention. OSB composite panels were also produced using adhesive systems (pMDI, BASF M20SB, and two linseed oil adhesives) for comparison. pMDI (BASF M20SB) was mixed with adhesive additives of the invention at two weight ratios, i.e., 1:1 and 3:1. The adhesive compositions were added to the wood product at the 2% and 4% binder level. The total binder loading is based on the total dry weight of the strands. The wood product manufacturing process is the same as the one described in Example 6.

OSB performance results are summarized in Tables 22 and 23. MOR, MOE, and the bond durability (MOR after 2 hrs of water soak) were based on an average of 9 specimens, IB was based on an average of 18 specimens, and thickness swell was based on an average of 6 specimens. From the data summarized in Tables 14 and 15 the following conclusions can be stated.

1. The binder concentration at 4% performed better than at 2%, regardless of the additive type.

2. The adhesive compositions at a weight ratio of 3:1 performed better than adhesive compositions at a weight ratio of 1:1, irrespective of the additive used.

3. Additive D13 exhibits a comparable overall performance to the control at a weight ratio of 3:1. At this ratio, the performance trend is D13>Castor oil>D14> linseed oil from ADM.

TABLE 20

ASTM D-5751 Finger Joint Performance.
Rubinate M/Additive at 1:1 weight ratio.
Substrate: Douglas Fir (MC = 6.5 to 7.0%)

| Additive | Sp. Gr. | Dry, psi (wf %) | Vac-P, psi (wf %) | 2-Cycle Boil, psi (wf %) |
|---|---|---|---|---|
| Rubinate M (Control) | 0.58–0.52 | 1331 ± 177 (88 ± 16) | 786 ± 54 (42 ± 19) | 546 ± 118 (31 ± 16) |
| D9 (FN = 1.9) | 0.52–0.61 | 1181 ± 233 (60 ± 42) | 707 ± 102 (9 ± 2) | 303 ± 216 (7 ± 3) |
| D10 (FN-1.8) | 0.56–0.56 | 1402 ± 112 (85 ± 14) | 738 ± 79 (27 ± 14) | 485 ± 75 (34 ± 17) |
| D11 (FN = 1.7) | 0.57–0.57 | 1389 ± 216 (35 ± 0) | 775 ± 65 (19 ± 7) | 323 ± 167 (13 ± 6) |
| D12 (FN = 1.6) | 0.57–0.58 | 1537 ± 168 (55 ± 21) | 932 ± 50 (21 ± 11) | 388 ± 89 (14 ± 9) |

TABLE 21

| Additive | Ratio | Binder level |
|---|---|---|
| BASF M20SB (control, no additive) | 100% | 2% |
| Linseed oil (ADM) | 3/1 | 4% |
| D13 | 3/1 | 2% |
| P12 | 3/1 | 4% |
| D14 | 3/1 | 2% |
| P12 | 1/1 | 2% |
| Linseed oil (ADM) | 1/1 | 2% |
| D13 | 1/1 | 4% |
| D14 | 1/1 | 4% |
| BASF M20SB (control, no additive) | 100% | 4% |
| P12 | 3/1 | 2% |
| D14 | 1/1 | 2% |
| Linseed oil (ADM) | 1/1 | 4% |
| P12 | 1/1 | 4% |
| D13 | 1/1 | 2% |
| D14 | 3/1 | 4% |
| Linseed oil (ADM) | 3/1 | 2% |
| D13 | 3/1 | 4% |

TABLE 22

Summary at 2% Binder.

| Adhesive | MOR (psi) | MOE (psi × 1000) | IB (psi) | MOR after 2 hr Soak | TS (%) | L. Expan. (%) |
|---|---|---|---|---|---|---|
| BASF M20SB (control, no additive) | 4300 | 674 | 57.4 | 1980 | 12.9 | 0.33 |
| 3/1 (P12) | 5190 | 682 | 78.1 | 1990 | 12.6 | 0.35 |
| 3/1 (D13) | 4080 | 659 | 69.3 | 2030 | 10.9 | 0.33 |
| 3/1 (D14) | 4070 | 653 | 75.0 | 1860 | 11.3 | 0.37 |
| 3/1 (ADM linseed oil) | 4140 | 675 | 68.8 | 1710 | 11.7 | 0.35 |
| 1/1 (P12) | 4360 | 646 | 55.2 | 1550 | 14.0 | 0.35 |
| 1/1 (D13) | 3900 | 662 | 56.0 | 1300 | 12.8 | 0.38 |
| 1/1 (D14) | 3360 | 593 | 51.2 | 1100 | 15.0 | 0.39 |
| 1/1 (ADM linseed oil) | 3540 | 656 | 45.3 | 1240 | 14.6 | 0.36 |

TABLE 23

Summary at 4% Binder.

| Adhesive | MOR (psi) | MOE (psi × 1000) | IB (psi) | MOR after 2 hr Soak | TS (%) | L. Expan. (%) |
|---|---|---|---|---|---|---|
| BASF M20SB (control, no additive) | 5670 | 762 | 127.4 | 2790 | 8.7 | 0.29 |
| 3/1 (P12) | 5090 | 693 | 90.3 | 2800 | 8.6 | 0.28 |
| 3/1 (D13) | 5760 | 756 | 139.6 | 2720 | 8.2 | 0.28 |
| 3/1 (D14) | 5550 | 730 | 133.8 | 2500 | 8.7 | 0.27 |
| 3/1 (ADM linseed oil) | 5150 | 706 | 89.6 | 2610 | 8.4 | 0.30 |
| 1/1 (P12) | 5550 | 706 | 106.1 | 2240 | 10.1 | 0.28 |
| 1/1 (D13) | 4820 | 669 | 95.5 | 2360 | 9.9 | 0.31 |
| 1/1 (D14) | 4610 | 687 | 80.8 | 1780 | 10.7 | 0.32 |
| 1/1 (ADM linseed oil) | 4500 | 722 | 93.0 | 1720 | 10.0 | 0.32 |

The invention claimed is:

1. A wood composite comprising a material selected from the group consisting of wood strands, wood particles, and cellulose fibers, and a cured binder, wherein the cured binder comprises a crosslinked polymer that is a reaction product of one or more polyisocyanate resins, and an adhesive additive containing castor oil and one or more triglycerides, wherein the castor oil and the one or more triglycerides are provided as a weight ratio of castor oil to triglyceride from about 4:1 to about 1:4.

2. The wood composite of claim 1 wherein the one or more polyisocyanate resins is selected from the group consisting of polyphenylene diisocyanate and polymethylene polyphenyl isocyanates.

3. The wood composite of claim 1 wherein the crosslinked polymer is prepared from the polyisocyanate resins and the adhesive additive provided in a weight ratio of resin to adhesive additive from about 3:1 to about 1:1.

4. The wood composite of claim 1 wherein the weight ratio of castor oil to triglyceride is from about 3:1 to about 1:2.

5. The wood composite of claim 1 wherein the one or more triglycerides is selected from the group consisting of soybean oil, canola oil, corn oil, and linseed oil.

6. The wood composite of claim 1 wherein the material is wood strands and the wood composite is oriented strand board.

7. A wood composite comprising a material selected from the group consisting of wood strands, wood particles, and cellulose fibers, and a cured binder, wherein the cured binder comprises a crosslinked polymer that is a reaction product of one or more polyisocyanate resins and castor oil, wherein the resins and the castor oil are provided in a respective weight ratio of from about 3:1 to about 1:2, and the cured binder is present in an amount of 1% to 10% by weight based on the weight of the material.

8. The wood composite of claim 7 wherein the resins and the castor oil are provided in a respective weight ratio from about 3:2 to about 2:3.

9. A wood composite comprising wood strands and a cured binder, wherein the binder comprises a crosslinked polymer that is a reaction product of one or more polyisocyanate resins and an adhesive additive, the adhesive additive comprising a reaction product from the transesterification of one or more polyols and one or more triglycerides, and a weight ratio of polyol to triglyceride provides a calculated hydroxyl functionality of about 1.3 to about 2.6 in the transesterified reaction product.

10. The wood composite of claim 9 wherein the polyol is selected from the group consisting of of trimethylolpropane, pentaerythritol, castor oil, dipentaerythritol, tripentaerythritol, 1,2,4-butanetriol, 1,2,6-hexanetriol, glycerol, erythritol, sorbitol, mannitol, xylitol, castor oil, 1,3-propanediol, 1,3-butanediol, 1,4-butanediol, 1,5-pentanediol, 1,6-hexanediol, neopentylglycol, cyclohexane dimethanol, 2,2,4-trimethyl pentanediol, dicyclopentadienediol, ethylene glycol, diethylene glycol, propylene glycol, dipropylene glycol, triethylene glycol, and polyethylene glycol.

11. The wood composite of claim 9 wherein the polyisocyanate resins and the adhesive additive are provided in a weight ratio of resin to additive from about 3:1 to about 1:1.

12. The wood composite of claim 9 wherein the one or more triglycerides is selected from the group consisting of soybean oil, canola oil, corn oil, and linseed oil.

13. A composite comprising synthetic fibers and a cured binder, wherein the cured binder comprises a crosslinked polymer that is a reaction product of one or more polyisocyanate resins, and an adhesive additive containing castor oil and one or more triglycerides, wherein the castor oil and the one or more triglycerides are provided as a weight ratio of castor oil to triglyceride from about 4:1 to about 1:4.

14. The composite of claim 13 wherein the synthetic fibers comprise organic polymers selected from the group consisting of polyacrylonitrile, aromatic polyamides, aliphatic polyamides, polyesters, poly(vinyl chloride), and poly(vinyl alcohol) and combinations thereof.

15. The composite of claim 13 wherein the synthetic fibers comprise an inorganic material selected from the group consisting of glass, metal, and ceramic.

16. A composite comprising synthetic fibers and a cured binder, wherein the cured binder comprises a crosslinked polymer that is a reaction product of one or more polyisocyanate resins and castor oil, wherein the resins and the castor oil are provided in a respective weight ratio of from about 3:1 to about 1:2, and the cured binder is present in an amount of 1% to 10% by weight based on the weight of the material.

17. The composite of claim 16 wherein the synthetic fibers comprise organic polymers selected from the group consisting of polyacrylonitrile, aromatic polyamides, aliphatic polyamides, polyesters, poly(vinyl chloride), and poly(vinyl alcohol) and combinations thereof.

18. The composite of claim 16 wherein the synthetic fibers comprise an inorganic material selected from the group consisting of glass, metal, and ceramic.

19. A composite comprising synthetic fibers and a cured binder, wherein the binder comprises a crosslinked polymer that is a reaction product of one or more polyisocyanate resins and an adhesive additive, the adhesive additive comprising a reaction product from the transesterification of one or more polyols and one or more triglycerides, and a weight ratio of polyol to triglyceride provides a calculated hydroxyl functionality of about 1.3 to about 2.6 in the transesterified reaction product.

20. The composite of claim 19 wherein the synthetic fibers comprise organic polymers selected from the group consisting of polyacrylonitrile, aromatic polyamides, aliphatic polyamides, polyesters, poly(vinyl chloride), and poly(vinyl alcohol) and combinations thereof.

21. The composite of claim 19 wherein the synthetic fibers comprise an inorganic material selected from the group consisting of glass, metal, and ceramic.

* * * * *